Figure 1:
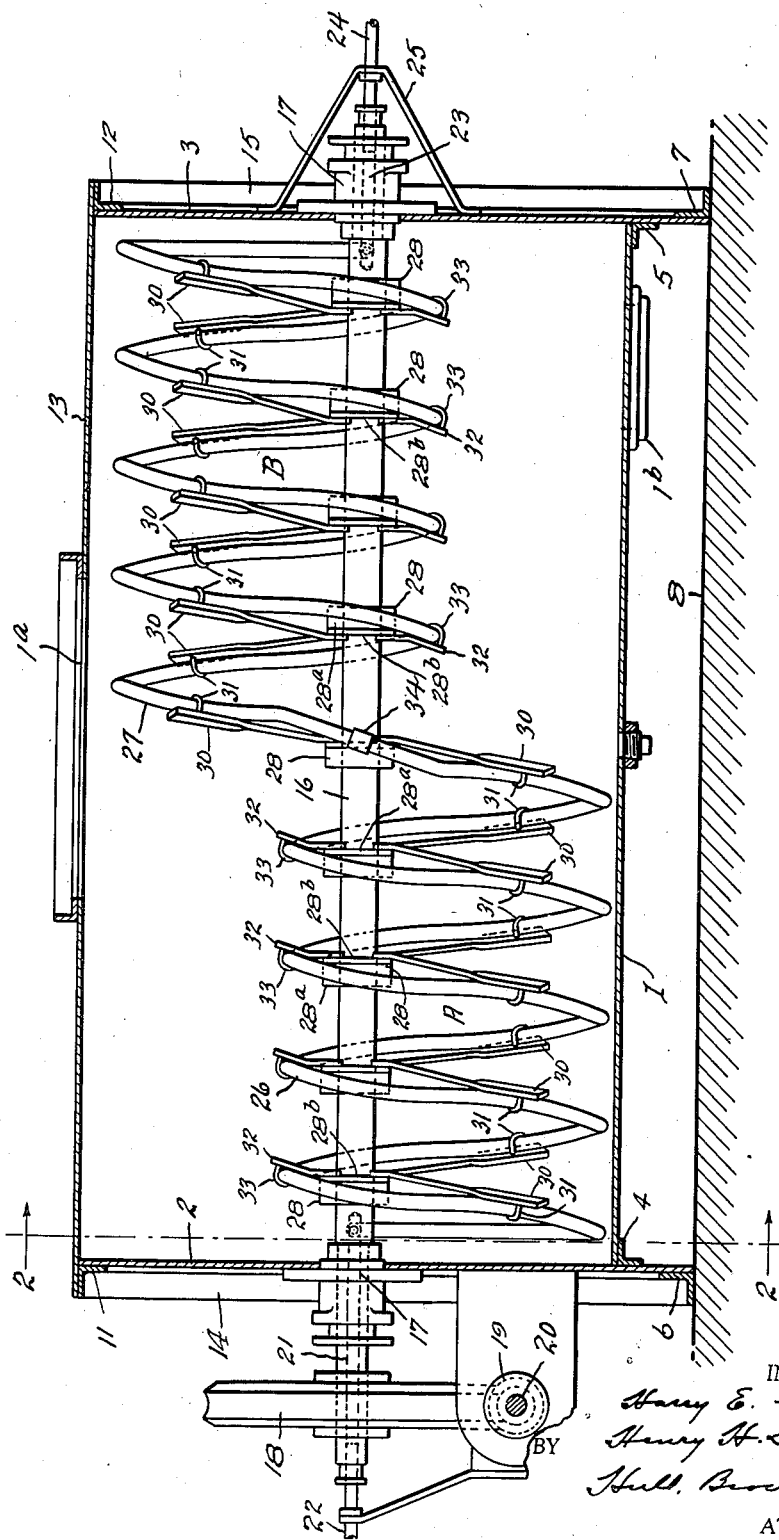

Oct. 26, 1937.  H. E. GRILL ET AL  2,097,208
SUGAR CRYSTALLIZING APPARATUS
Filed Jan. 15, 1937  6 Sheets-Sheet 1

INVENTORS.
Harry E. Grill,
Henry H. Feldstein,
BY Hull, Brock & West.
ATTORNEYS.

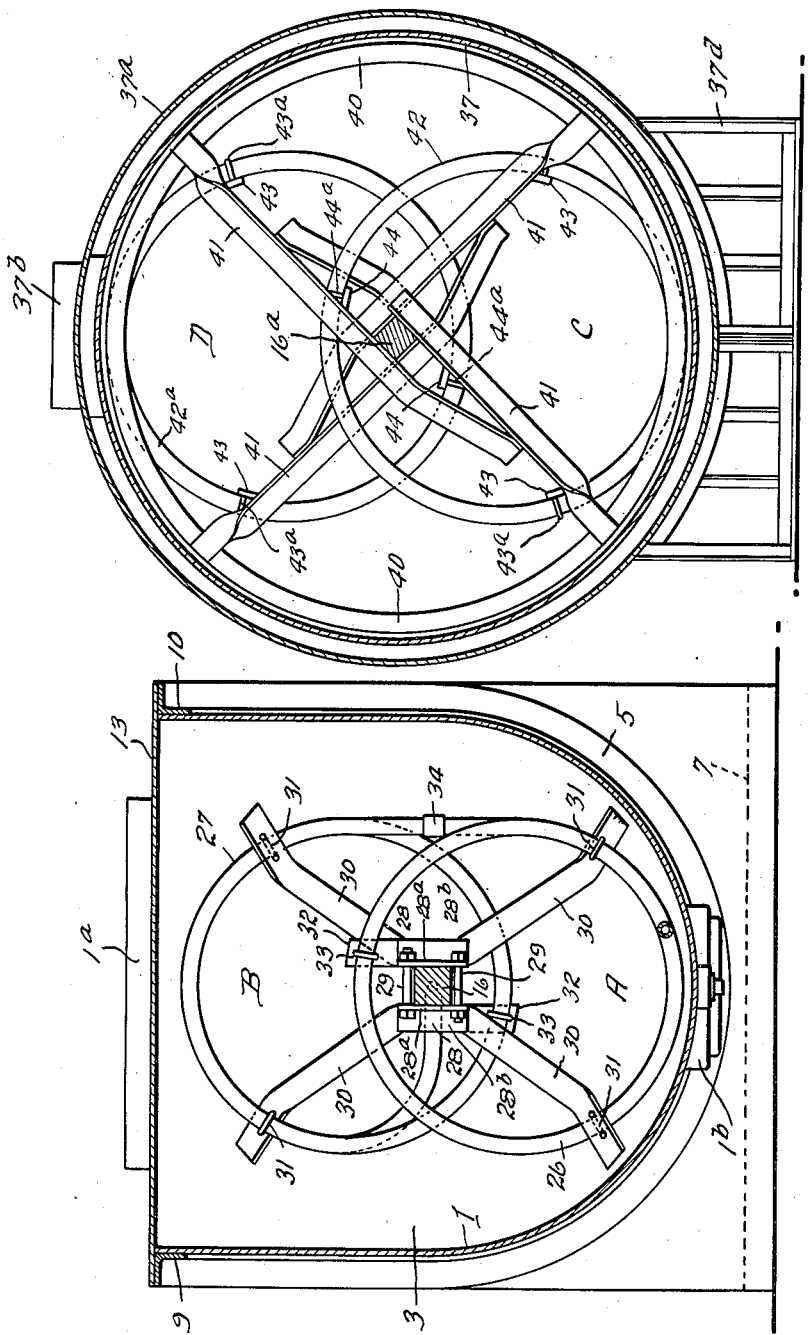

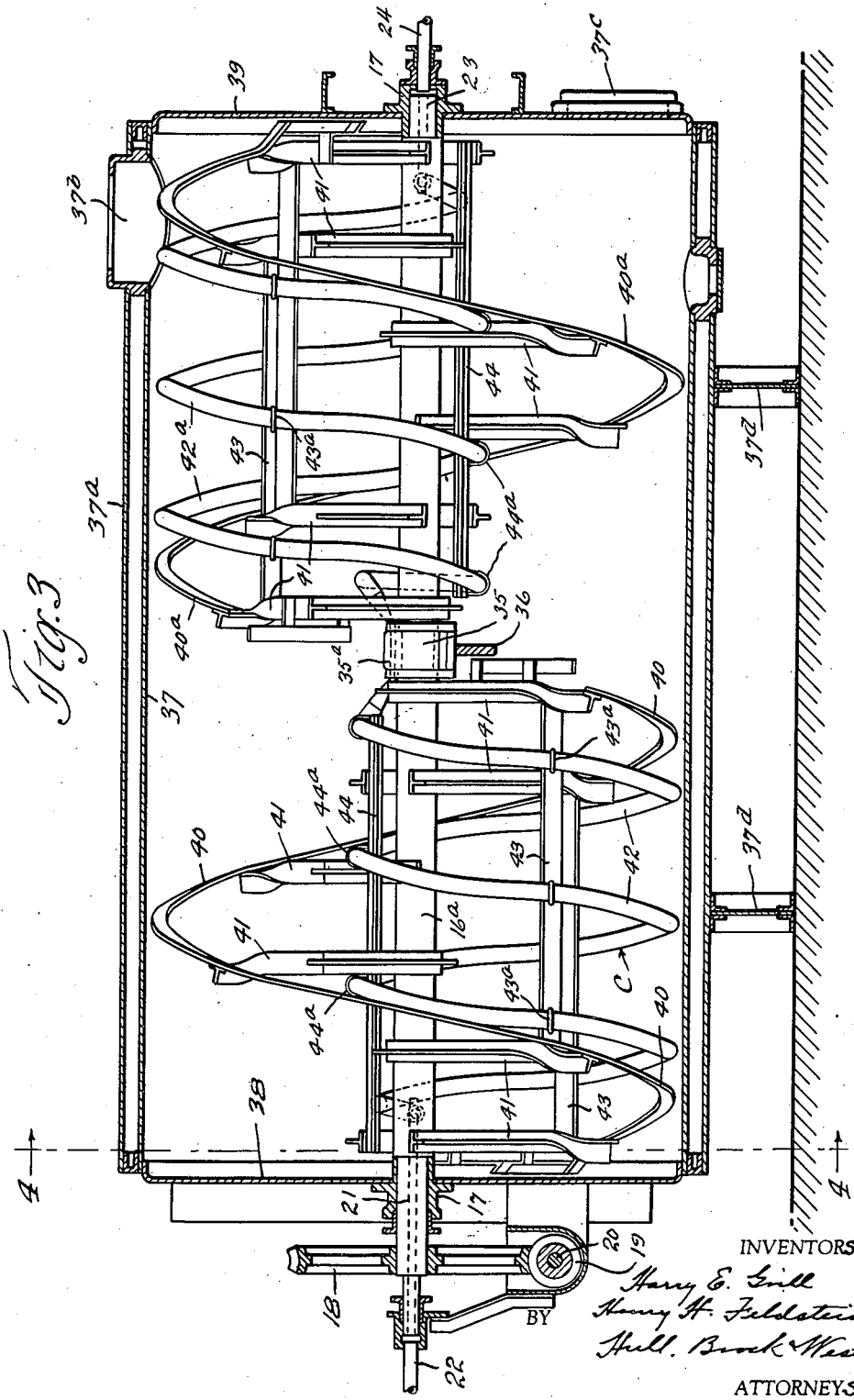

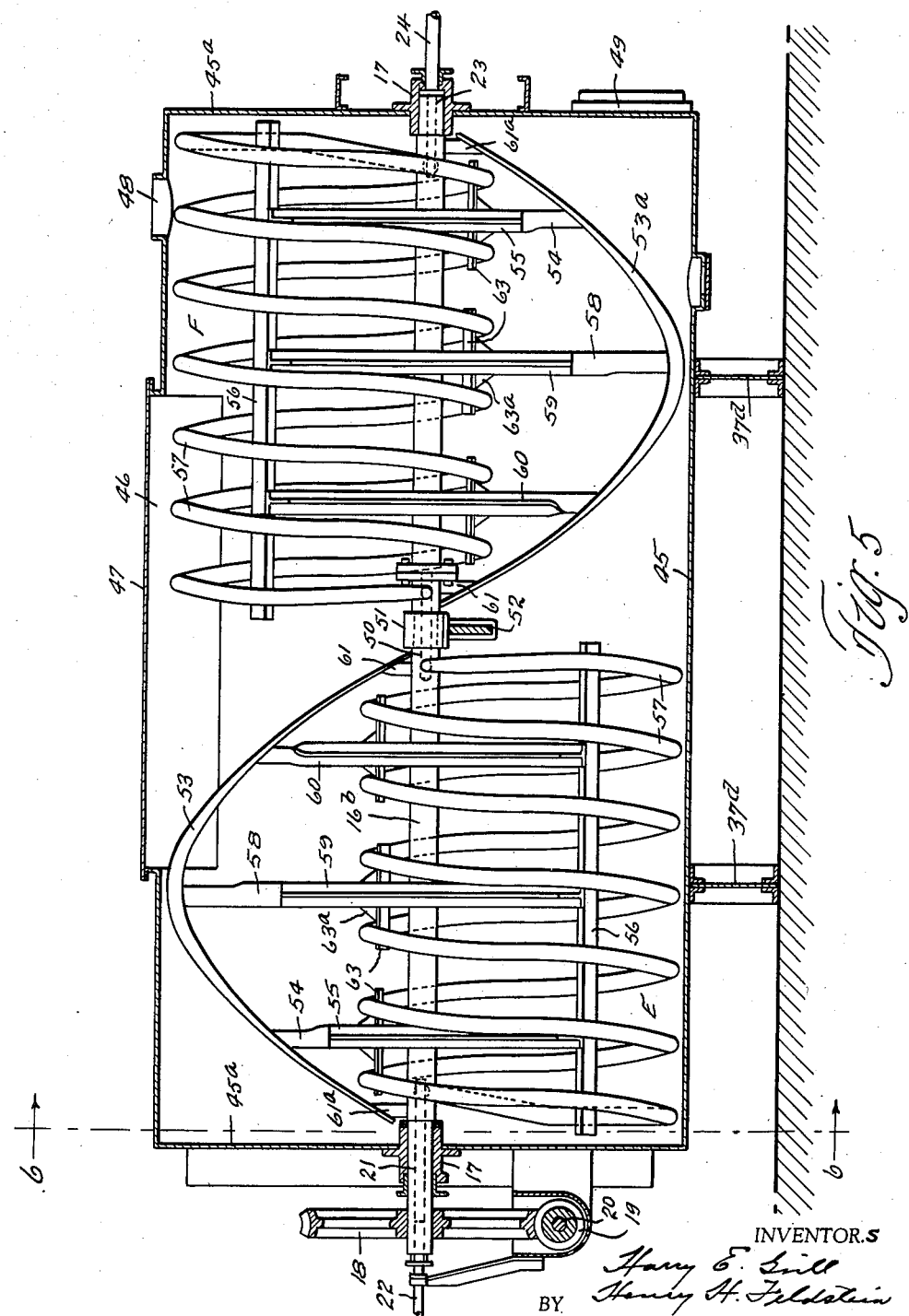

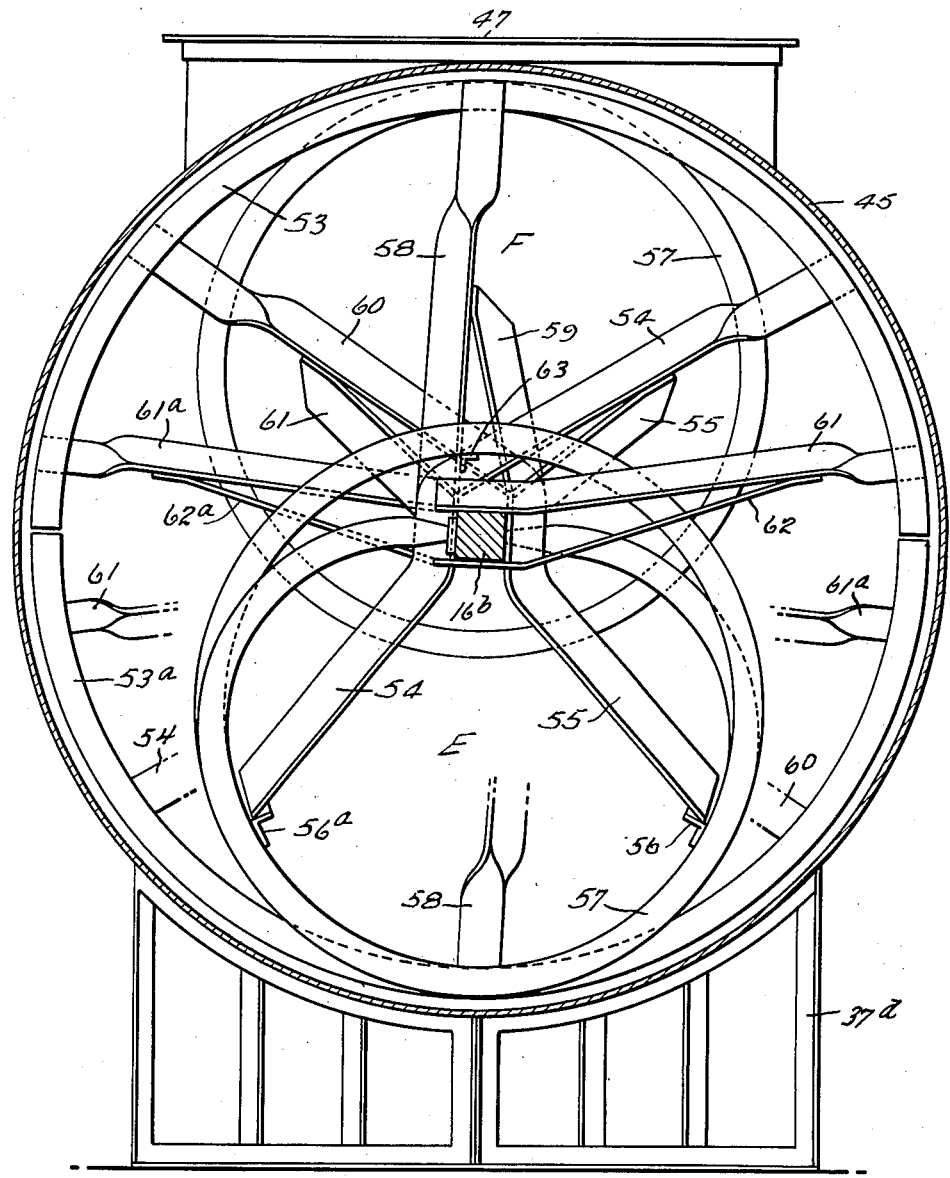

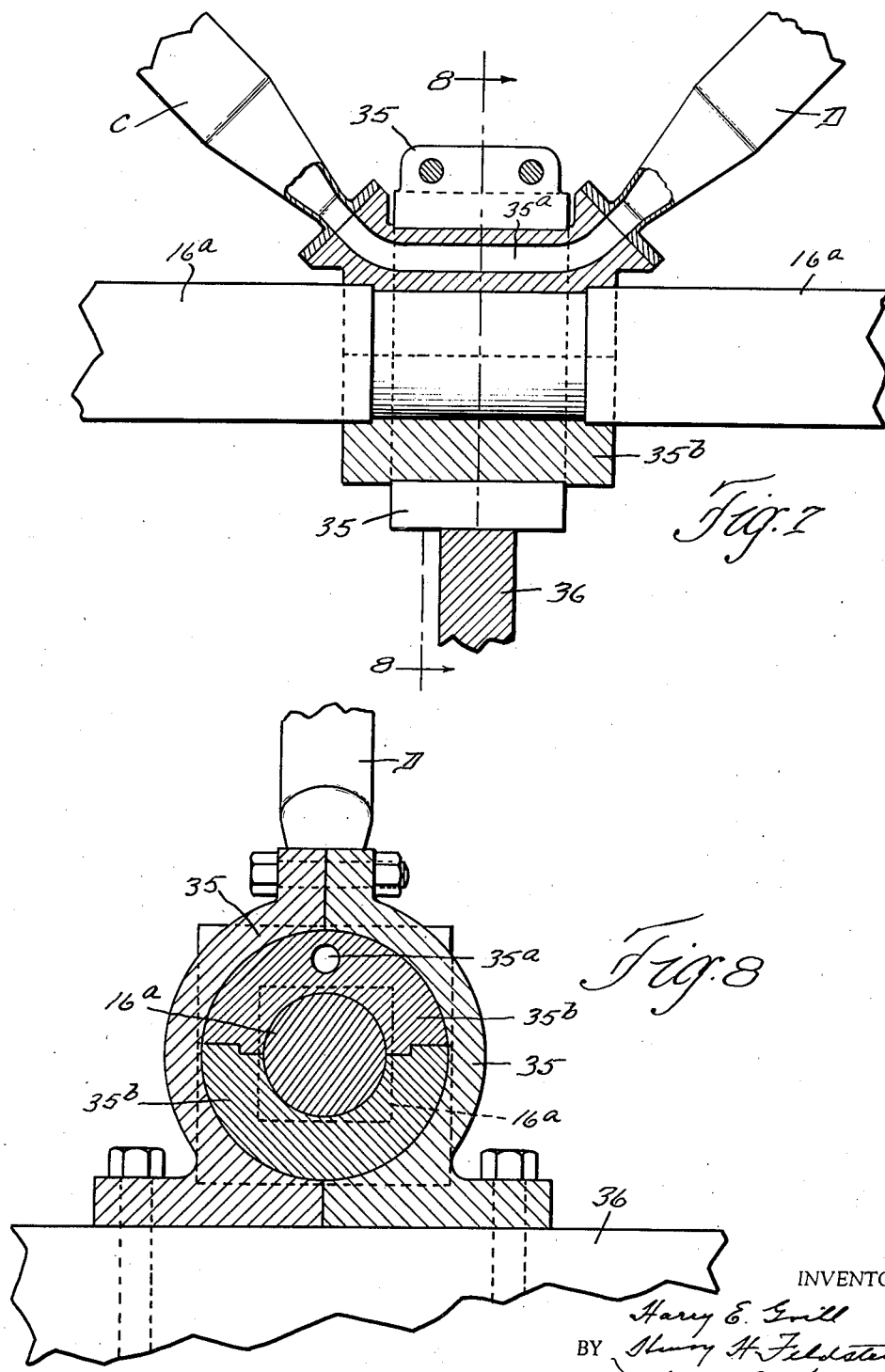

Patented Oct. 26, 1937

2,097,208

UNITED STATES PATENT OFFICE 2,097,208

SUGAR CRYSTALLIZING APPARATUS

Harry E. Grill, Willoughby, and Henry H. Feldstein, Cleveland, Ohio, assignors to The Kilby Manufacturing Company, Cleveland, Ohio, a corporation of Ohio Application January 15, 1937, Serial No. 120,676

5 Claims. (Cl. 127—15)

This invention relates to apparatus for effecting the crystallization of sugar from the mother liquid or from massecuite and has for its general object to improve the efficiency of such apparatus and more particularly in respect to the time required to effect such crystallization.

We accomplish the foregoing objects, and other and more limited objects which will be described in the specification and illustrated in the drawings hereof, wherein Fig. 1 represents a central longitudinal sectional view taken through a crystallizing tank, the coil and the shaft carrying the same being shown in elevation; Fig. 2 a detail in section corresponding to the line 2—2 of Fig. 1 and looking in the direction of the arrows; Fig. 3 a view similar to Fig. 1 and showing a modified form of our invention; Fig. 4 a sectional view corresponding to the line 4—4 of Fig. 3 and looking in the direction of the arrows; Fig. 5 a view, similar to Figs. 1 and 3, showing a still further modification of our invention; Fig. 6 an enlarged detail in section corresponding to the line 6—6 of Fig. 5 and looking in the direction of the arrows; Fig. 7 a detail in longitudinal section through the bearing of the shaft in Fig. 3 and Fig. 8 a detail in transverse section through said shaft and bearing.

Referring first to Figs. 1 and 2 and describing the parts shown therein by reference characters, 1 denotes the main body of the crystallizer tank, which is shown as of U-form in section and having its ends closed by the heads 2 and 3 from which it is supported by the U-shaped angle iron braces 4 and 5 respectively. The heads are extended below the bottom of the tank, and their lower ends are shown as provided with angle iron braces 6 and 7 extending thereacross and cooperating with said lower ends to support the body of the tank and its contents from the floor 8.

The tank 1 is provided with angle braces 9, 10, 11 and 12 extending along the tops of the sides and heads thereof and with a cover 13. Similar angle braces 14 and 15 extend along the sides of the heads.

16 denotes a shaft, which may be of any shape and which may be solid or tubular but is shown here as square or rectangular in cross section and as having its ends mounted for rotation in journals 17 carried by the heads 2 and 3. One end of the shaft has a worm gear 18 secured thereto, the said gear being driven by means of a worm 19 on a worm shaft 20. The end of the shaft to which the worm gear is secured is provided with a channel 21 forming part of the conduit by means of which water is introduced into the coil secured to the shaft within the tank. 22 denotes a pipe for delivering water into the channel 21 and thence into the receiving end of a coil which, as shown, comprises two diametrically-opposed coil sections A and B, each mounted eccentrically upon the shaft 16. The delivery end of the coil section B communicates with a channel 23 in the corresponding end of the shaft, the latter channel communicating with the outlet pipe 24, which is shown as supported from the head 3 by the bracket 25.

The coil

The coil, as indicated hereinbefore, comprises two helical coil sections A and B of opposite eccentricity; that is to say, each section comprises a plurality of convolutions 26, 27, the centers of the convolutions of one coil section being diametrically opposite the centers of the convolutions of the other coil section. Due to this arrangement, at each revolution of the shaft 16, the major portion of the mass of the liquid in the tank will be brought into contact with some portion of the coil sections as they rotate. However, if only the coil sections should rotate with the shaft, only a very slight forward movement would be imparted to the liquid in the tank longitudinally of the latter. In order to increase such movement as well as to stir the liquid, we have incorporated stirring mechanism with the coils and have so designed the said mechanism and the constituent parts thereof that they serve not only to impart the desired amount of movement to massecuite of high purity but also to support the convolutions of the coil. The construction whereby this result is obtained is shown in detail herein and comprises a plurality of supports secured to the shaft, with stirrer arms secured to said supports and having their outer ends secured to the convolutions. Each support is shown herein as comprising a pair of angle iron bars 28 having flanges 28ª bearing against opposite sides of the shaft 16, the said bars being secured to the shaft by means of bolts 29 extending through the said flanges. Long stirrer blades or arms 30 are secured at their inner ends to the flanges 28ᵇ while their outer ends are secured to the portions of the convolutions which are remote from the shaft, as shown at 31. The portion of each convolution which is adjacent to the shaft is supported by a short stirrer arm 32 which is secured thereto as shown at 33. The stirrer blades are each given a pitch which will enable them to impart a movement of the massecuite longitudinally of the tank when the coil is rotated. The coil sections A and B are preferably made separately and connected by a suitable coupling, as shown at 34. When operating upon certain types of massecuite of comparatively high purity, such as is employed in the manufacture of corn sugar, for instance, it will be necessary to provide the shaft with additional means for propelling the massecuite longitudinally of the tank, such, for instance, as is shown in Figs. 3 to 6.

With the parts arranged as described and shown in Figs. 1 and 2, it is believed that the operation will be readily understood. The tank body is filled with massecuite through the opening 1ª and the shaft is rotated, while water is circulated through the coil in the usual manner. Due to the eccentric mounting of the coils upon the shaft and the cooperation of the stirrers, every point in a cross section taken through the massecuite is contacted by the coil sections as they rotate. This enables the heat interchange between the liquid in the coil and that in the tank to be accomplished with a rapidity and uniformity far surpassing that which is obtainable by any standard crystallizing apparatus with which we are familiar.

Figs. 3 and 4 illustrate a modification of our invention, said modification consisting generally in the use of different means for supporting the coil sections from the shafts; in a different form of stirring mechanism; and in a different manner of circulating the liquid through the coil sections. They also show a tank of circular section provided with a water jacket. However, it is obvious that a water jacket may also be employed with the tank shown in Figs. 1, 2, 5 and 6.

Describing the parts shown in said views by reference characters, the shaft 16ª is provided at one end with a worm gear 18 driven by the worm 19 on the shaft 20. The liquid is supplied to a channel 21 in the outboard end of the shaft through a pipe 22 and from said channel to the coil section C. The delivery end of this coil section communicates with a channel 35ª provided in the bushing 35ᵇ of the central split bearing 35 for the shaft, said bearing being carried by a support 36 extending transversely of and secured at its opposite ends to the inner wall of the tank. The inlet end of the opposite coil section D communicates with the channel 35ª, and its outlet end communicates with the channel 23 in the corresponding end of the shaft, which channel in turn communicates with the delivery pipe 24—as is the case with the construction shown in Figs. 1 and 2.

The tank comprises a cylindrical body 37 having its opposite ends closed by the heads 38 and 39, in which the bearings 17 are mounted. The tank is shown as provided with a shell 37ª extending therearound and providing a water jacket, with a suitable filling opening 37ᵇ in the top thereof, and with an outlet 37ᶜ in the bottom thereof, through which the contents may be withdrawn, the said opening being provided with a removable plug (not shown). The tank may be conveniently supported by cradles 37ᵈ.

Instead of employing relatively short stirrer blades, we use for each coil section a continuous stirrer which is of helical form; the periphery of each stirrer is in close proximity to the inner wall of the tank, whereby it also performs a scraping function. Each stirrer 40, 40ª is supported from the shaft 16ª by means of brace bars 41 which are suitably secured at their inner ends to the shaft.

The portions of the convolutions 42 and 42ª which are more remote from the shaft 16ª are supported in turn by means of longitudinally extending braces 43 connected thereto at 43ª and the portions of the convolutions which are in proximity to the shaft are supported by a longitudinally extending brace 44 connected thereto at 44ª. These braces are connected in turn to the brace bars 41, as by welding or other suitable means, and the braces 43 and 44 also serve as stirrers.

The operation of the apparatus shown in Figs. 3 and 4 is similar to that of the apparatus shown in the preceding views, it being noted that the combined scraper and stirrer members 40, 40ª are given a pitch so as to impart movement to the liquid in a direction longitudinally of the tank. The apparatus possesses in general the same advantages as are possessed by the apparatus shown in the preceding views and in addition is capable of operating efficiently with massecuite of high purity, such as is employed in the manufacture of corn sugar.

In Figs. 5 and 6, there is illustrated a further modification of our invention which is in general similar to that shown in Figs. 3 and 4, the tank 45 being shown as cylindrical and with the heads 45ª integrally united thereto. The tank is supported by cradles 37ᵈ similar to those shown in the two preceding views, and is provided with a large central opening 46 in the top thereof, having a cover 47; also with a smaller opening 48 in the top thereof and with an opening 49 in the bottom through which the contents may be removed, the opening having a closure (not shown). The shaft 16ᵇ is in general similar to that shown in the preceding views and is mounted in journals 17 in the heads 45ª and is driven by the worm gear 18, worm 19 and shaft 20. Liquid is introduced through a pipe 22 into a channel 21 formed in the receiving end of the shaft and is delivered thence into the coil section E, the delivery end of which communicates with a channel 50 in the central portion of the shaft, which channel in turn communicates with the inlet end of the coil section F, the delivery end of the latter communicating with the channel 23 in the shaft, and the latter in turn communicating with the outlet pipe 24. The central portion of the shaft is supported by a bearing 51 carried by a transverse support 52.

The combined scraper and stirrer in this case comprises two blades 53, 53ª, which jointly constitute one elongated convolution of a helix, carried by the shaft and rotating in close proximity to the inner wall of the tank.

The combined scraper and stirrer sections are supported by means of brace bars secured to the shaft in any desirable manner, as by being welded thereto, and having their outer ends secured to the stirrer sections, as by welding or other suitable means. These brace bars are made in pairs arranged transversely of the tank and comprising each an arm secured to the appropriate brace bars of the convolutions which are remote from the shaft. One of each pair of braces is provided with a long arm which is secured to the appropriate scraper and stirrer section, while the other brace bar of each pair is provided with a shorter arm extending beyond the shaft and bearing against the longer arm of its mate. The longer bars are bent so that the longer arms thereof engage the appropriate scraper and stirrer section at points preferably equi-angularly spaced apart while their shorter arms engage the appropriate brace bars of the convolutions of the eccentric coil; and the cooperating shorter brace bars have their shorter arms bent so as to engage the longer arms of their respective longer brace bars, and their other arms the appropriate brace bars of the eccentric coil, as described below.

The lower ends of the pair of brace bars 54 and 55 are in engagement with and secured to the longitudinal bars 56, 56ª, respectively, which are secured to the convolutions 57 of the coil E at points remote from the shaft. The upper and longer arm of the brace bar 54 is secured to the scraper and stirrer section 53, while the upper end of the shorter arm of the bar 55 engages and braces the long arm of the bar 54.

The longer brace bar 58 has its lower and shorter arm immediately in the rear of the lower and shorter arm of the bar 54, while its upper and longer arm is secured to the scraper and stirrer section 53. The corresponding shorter brace bar 59 has its lower and longer arm immediately behind the long arm of the bar 55, while its upper arm bears against the arm 58. In like manner, the long upper arm of the brace bar 60 is engaged by the shorter upper arm of the brace bar 61, the lower arm of the bar 60 being behind the short arm of the bar 54 and the lower arm of the brace bar 61 being behind the lower arm of the bar 55.

In addition, two brace bars 61 and 61ª are shown as secured to the top of the shaft 16ᵇ near the inlet to the coil E and are connected to the opposite ends of the stirrer section 53, but are braced in turn by the arms 62 and 62ª, also secured to the shaft. Similar brace bars are secured to the shaft adjacent to the delivery end of the coil E, one of the same being indicated at 62ª in Fig. 5.

The same arrangement of brace bars is employed in the coil F, and detailed illustration of the same is believed to be unnecessary. The brace bars and the parts thereof which correspond to those described in connection with coil section E and the scraper and stirrer section 53 are designated by like numerals in Fig. 5.

The shorter convolutions of the coil sections are in turn strengthened by the short longitudinal braces 63 secured thereto and to the brace bars as shown at 63ª.

Obviously, other means than those shown and described herein can be employed for supporting the coils and the scraper and stirrer sections from the shaft.

While we have shown two coils or coil sections in each installation shown herein, it will be obvious that a single eccentrically mounted coil can be used instead of two interconnected coils or coil sections, especially where the coils are to be used in comparatively short tanks.

Having thus described our invention, what we claim is:—

1. The combination, with a circular crystallizer tank, of a shaft mounted within and extending longitudinally through said tank, a helical coil of tubing of relatively short pitch mounted on said shaft, wholly eccentrically thereof, means for rotating said shaft, means for circulating cooling liquid through said coil, and a combined helical scraper and stirrer operatively connected to said shaft concentrically therewith and extending in proximity to the inner wall of the tank.

2. In the combination recited in claim 1, means connecting the combined scraper and stirrer with the convolutions of said coil.

3. The combination, with a circular crystallizer tank, of a shaft mounted within and extending longitudinally through said tank, a helical coil of tubing of relatively short pitch mounted on said shaft, wholly eccentrically thereof, a second helical coil of tubing of relatively short pitch mounted on said shaft, wholly eccentrically thereof, the centers of the convolutions of one coil being arranged opposite to the centers of the convolutions of the other coil, the convolutions of said coils extending in the same direction, helical combined scraper and stirrer means operatively connected to said shaft concentrically therewith and extending in proximity to the inner surface of said tank, the convolutions of said scraper and stirrer means extending in the same direction as the convolutions of said coils, means for rotating the shaft and means for circulating a cooling liquid in series through said coils.

4. In the combination recited in claim 3, the tank being provided with a water jacket surrounding the same.

5. In the combination recited in claim 1, the tank being provided with a water jacket surrounding the same.

HARRY E. GRILL.
HENRY H. FELDSTEIN.